United States Patent [19]

Wirkus

[11] Patent Number: 4,881,339

[45] Date of Patent: Nov. 21, 1989

[54] METHOD OF AND APPARATUS FOR FISHING WITH A BACKWARDS HOOK

[76] Inventor: Clarence Wirkus, 13435 NW. Jay St., Andover, Minn. 55304

[21] Appl. No.: 177,092

[22] Filed: Apr. 4, 1988

[51] Int. Cl.$^4$ .............................................. A01K 83/00
[52] U.S. Cl. ................................ 43/42.04; 43/42.41; 43/42.42; 43/43.4
[58] Field of Search ................... 43/42.1, 42.04, 42.4, 43/42.41, 42.42, 43.2, 43.4

[56] References Cited

U.S. PATENT DOCUMENTS

| | | | |
|---|---|---|---|
| 1,050,759 | 9/1913 | Betts et al. | 43/42.04 |
| 2,294,082 | 8/1942 | Fairfox | 43/42.04 |
| 2,597,035 | 5/1952 | Rickard | 43/42.4 |
| 2,635,381 | 4/1953 | Coons | 43/42.4 |
| 2,746,200 | 5/1956 | Dale | 43/42.04 |
| 2,956,364 | 10/1960 | Kuckiewicz | 43/42.04 |
| 3,231,999 | 2/1966 | Gurka | 43/42.42 |
| 3,494,062 | 2/1970 | Gardener | 43/42.04 |
| 3,818,626 | 6/1974 | Peippo | 43/42.04 |
| 4,006,551 | 2/1977 | Messacar | 43/42.04 |

FOREIGN PATENT DOCUMENTS 94492 10/1962 Denmark ................ 43/42.04

Primary Examiner—Nicholas P. Godici
Assistant Examiner—Karen Skillman
Attorney, Agent, or Firm—Henry C. Kovar

[57] ABSTRACT

A weedless artificial fishing lure and method of fishing has a lure body, a floppy mounted hook, and a resiliently flexible hook holder mounted to the body, the hook holder has structure for normally holding the hook backwards as the lure is pulled through water and for releasing the hook to a typical trailing position upon engagement by a fish. The method has the steps of pulling the lure through water, holding a floppy mounted hook backwards, and instantly releasing the hook to a typical trailing position upon engagement with a fish. A novel lure accessory is fastenable into the leading line connection aperture of the lure.

26 Claims, 2 Drawing Sheets

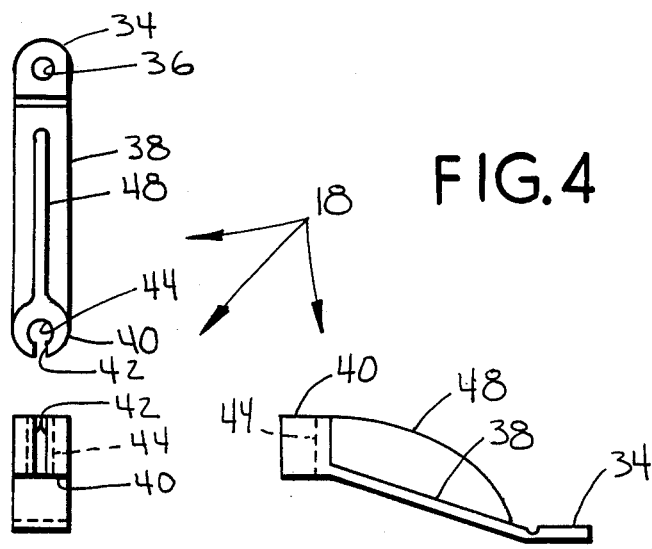
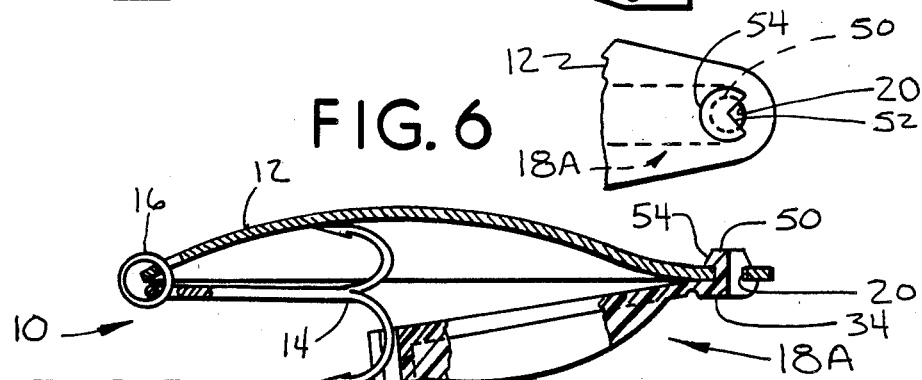
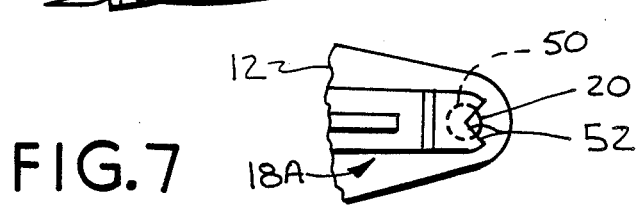
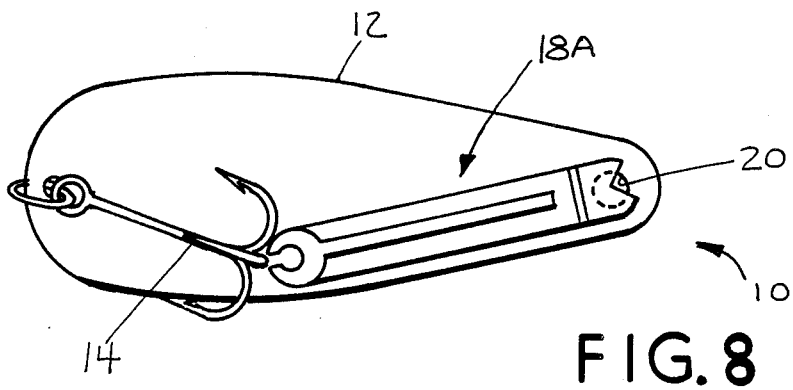

4,881,339

METHOD OF AND APPARATUS FOR FISHING WITH A BACKWARDS HOOK

BACKGROUND OF THE INVENTION

1. Field of the Invention

This invention pertains to an artifical lure with a backwards hook that is intended to be "weedless", and to a method of fishing with a backwards hook.

2. The Prior Art

Weedless artifical fishing lures have been around for a long time. All known weedless lures have their hook in a normal and typical trailing configuration with a mounting eye, the shank trailing rearward and a forward facing tine.

One specific example is a spoon having a single hook soldered to the convex side, with a resilient wire weed deflector in front of the hook.

A second example is a spoon having a slide mechanism to which the hook is mounted. The hook is pulled forward and the tine recessed in a crevice in the spoon. When a fish engages the spoon, the hook slides back and the tine(s) become exposed.

A third example is a floating plug with one or more resilient wires leading a fixed or floppy mounted hook.

OBJECTS OF THE INVENTION

It is an object of this invention to provide a new and improved weedless artificial fishing lure.

It is an object of this invention to provide a new method of and apparatus for fishing with a backwards hook.

It is an object of the present invention to provide a new hook holder for an artifical fishing lure.

It is an object of the present invention to provide an artificial fishing lure having new and improved weedless structure.

It is an object of the present invention to provide a lure improving accessory having a new structure for being secured to a lure.

SUMMARY OF THE INVENTION

An artificial fishing lure has a body, a floppy mounted hook, and a hook holder having structure for normally holding the hook backwards and for releasing the hook to a typical trailing position upon engagement by a fish.

In an artifical fishing lure having a body and a floppy mounted hook, the improvement of a hook holder mounted to the body for normally holding the hook backwards.

An integral one piece hook holder and weed deflector has a leading nose fastened to a lure body, an elongate resiliently flexible body, a tail, and snap structure in the tail for resiliently holding the wire of a hook.

An accessory for an artificial lure has a nose, structure aft of the nose for improving the lure and a generally C-shaped rivet insertable in and fastenable to a leading line connection aperture in the lure.

A method of weedless fishing with an artifical lure has the steps of pulling the lure through water, holding a floppy mounted hook backwards during the pulling, and releasing the hook to a normal trailing position upon engagement by a fish.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 4 is a projected triple illustration of the hook holder of the present invention;

FIG. 5 is a side elevational view of an alternative structure of the present invention;

FIG. 6 is a top plan view of FIG. 5; and

FIG. 7 is a bottom plan view of FIG. 5.

DESCRIPTION OF THE PREFERRED EMBODIMENT

Figure 1:
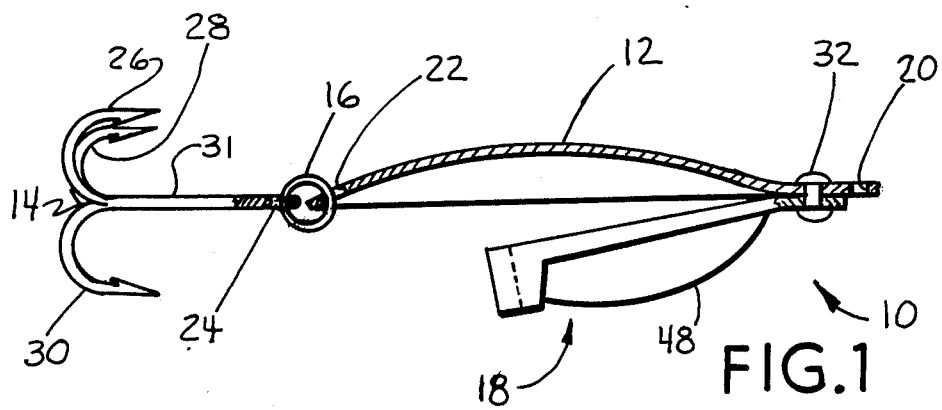
FIG. 1 is a side elevational view in partial section, of the preferred embodiment of an artificial fishing lure according to the present invention, with the hook in the trailing position.
Figure 2:
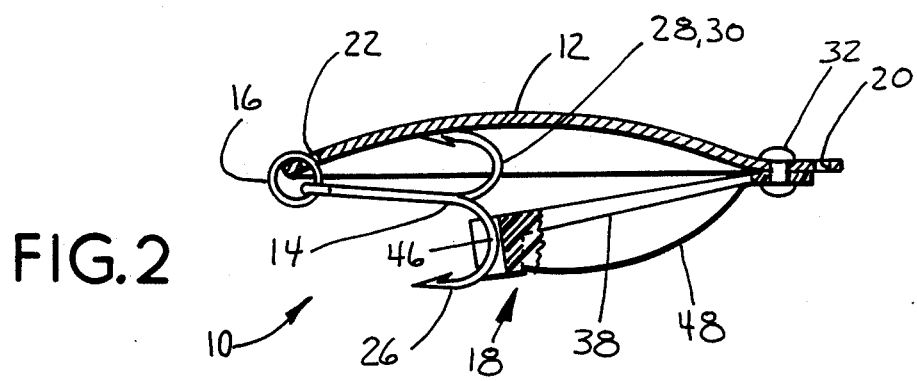
FIG. 2 is a second side elevational view with the hook shown in the backwards position.
Figure 3:
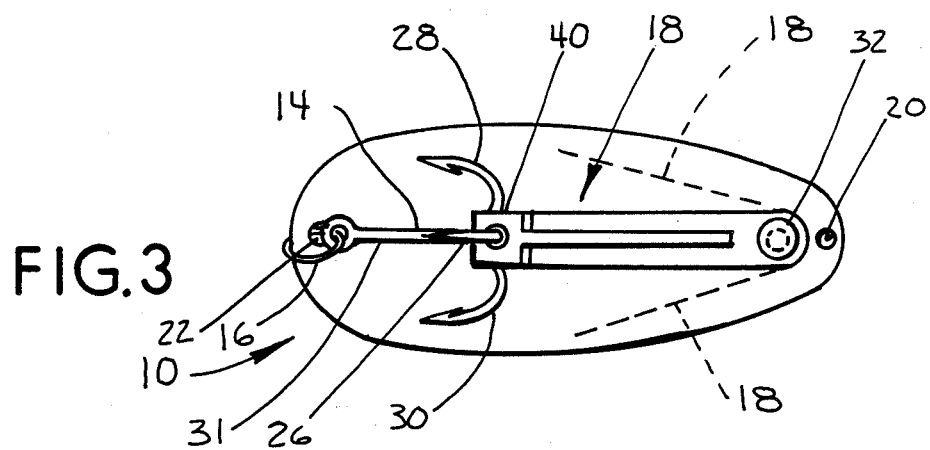
FIG. 3 is a bottom plan view of FIG. 2.

According to the principles of the present invention an artificial fishing lure is provided as shown in FIGS. 1–3 and generally indicated by the numeral 10. The lure 10 has a body 12, a hook 14 floppy mounted to the body 12 by a loose but captive ring 16, and a hook holder generally indicated by the numeral 18.

The body has a leading eye 20 to which a fishing line (not shown) is connectable for pulling the lure 10 through water. The ring 16 is extended through a rear aperture 22 and through an eye 24 of the hook 14. The hook 14 is preferably a treble hook 14 with three discrete tines 26, 28, 30 extending in cantilever fashion from a common shank 31.

The hook holder 18 is permanently fastened to the leading end of the body 12 with a rivet 32 or other suitable fastener. The rivet 32 may be an integral portion of the hook holder 18. The hook holder 18 is rotatable about the rivet 32 to either side as shown in dotted lines in FIG. 3.

The hook holder 18 is an integral one-piece injection molded plastic or elastomeric part made of a material such as polyethelene, polypropylene or a thermoplastic rubber. The hook holder 18 has a leading nose 34 with a fastening aperture 36 or the rivet 32, an elongate resiliently flexible holder body 38 and a trailing tail 40. Within the tail 40 is an elongate hook holder slot 42 which is positioned normal to the resilient spring action of holder body 38 and to the mounting surface of the nose 34.

The hook holder slot 42 is shaped like a keyhole with an enlarged inner diameter 44 that is a slip fit or soft interference fit on one of wire shanks 46 of the hook 14. The outer portion of the hook holder slot 42 is necked down smaller than the inner diameter 44 and is smaller than the diameter of the hook wire 46 so that it is a light press fit upon the hook wire 46. A deflector rib 48 extends from adjacent the front of the body 38 to the tail 40. The holder body 38 is essentially a cantilevered leaf spring enabling the tail 40 to move towards and away from the lure body 12.

FIGS. 5–7 illustrate an alternative embodiment of the present invention wherein the same body 12, hook 14 and ring 16 are utilized. The alternative hook holder 18A has a nose 34 with a generally C-shaped rivet 50 fastening the hook holder 18A into and through the leading aperture 20. The nose 34 and the rivet 50 both have a leading notch 52, which is preferably of about 90 degrees acuate width as measured from the centerline of rivet 50. The notch 52 gives both the nose 34 and rivet 50 its general C-shape as best shown in FIGS 6 and 7. At the outer end of the rivet 50 is a likewise generally C-shaped snap-fit retainer head 54 which is larger in diameter than the leading aperture 20 or the body of the rivet 50. The retainer head 54 is pressed through the aperture 20 and snapped out on the opposite surface of the body 12 to retain the hook holder 18A to the lure 10. The hook holder 18A is rotatable about the leading aperture 20, just as previously explained with respect to FIGS. 1-3. The fishing line and/or wire connector on the end of the fishing line (not shown) is extended through that part of the leading aperture 20 which is left open by the notch 52. This particular nose 32, rivet 50, notch 52 and retainer head 54 will attach any accessory to the body 12. The accessory can be the weed deflector and hook holder as shown, or can be a fly tail, a fin that duplicates swimming movement, a dependent spinner and so forth; i.e. anything that improves the lure 10.

In the use of the lure 10 and in the practice of the method of the present invention, the lure 10 is secured to a fishing line in the leading eyelet 20. The hook 14 is turned backwards into a normal backwards position shown in FIGS. 2 and 3. The hook holder tail 40 is pressed upon the outward extending hook wire 46 placing the hook wire 46 within the necked down portion of the slot 42 and within the enlarged inner diameter 44. The hook is then well grasped by the holder 18 and the lure 10 is then pulled through the water with either casting or trolling techniques.

When the lure 10 is engaged by a fish, the hook holder 18 is moved and resiliently releases its grasp upon the hook 14, and the hook 14 flops back to the typical trailing position shown in FIG. 1 for catching of the fish.

There are three basic motions by which the hook holder 18 will instantly release the backwards hook 14. If the fin 48, holder body 38 and tail 40 are pressed toward the lure body 12, the holder slot 42 will be snapped off the hook wire 46 releasing the hook 14. This deflection is shown in dotted line in FIG. 2. If the hook holder 18 is turned to either side as is shown in dotted lines in FIG. 3, the holder slot 42 will also be snapped off the hook wire 46 and the hook 14 released to the typical trailing position.

The turning of the hook holder 18, as shown in FIG. 3, can be effected firstly by engagement of the fish against the hook holder 18 itself, or by engagement against the outward extending tine 26 and/or hook wire 46. Movement of the hook 14 with respect to the lure body 12 will cause rotation of the hook holder 18 and instant release of the hook 14.

Either hook holder 18, 18A is preferably fastened to the lure body 12 with a light interference fit that provides frictioned resistance to rotation of the holder 18, 18A, but yet enables rotation of the holder by either a fish bite or manually. Either hook holder 18, 18A and its fin 48 may be skewed or rotated about the respective rivet 32, 50 and left in a skewed attitude with respect to the fore-aft axis of the body 12. Such a skewed configuration is shown in the left part of FIG. 7.

When the hook holder 18, 18A is parallel to the axis of the body 12, the lure 10 has a conventional back and forth or flip flop motion. It was found when the hook holder 18, 18A was skewed with respect to the axis of the body 12, the lure will do a few cycles of back and forth and then totally unexpectedly go into an extremely erratic motion and do one, two, or more barrel rolls before returning to the normal back and forth occillating movement. This erratic movement is quite unique and exemplary of a crippled feed fish.

The new lure 10, new hook holder 18 and new method of fishing with a backwards hook is extremely simple, low cost, easy to use, quite attractive, and an effective weedless fish catching lure 10 that can be made in small, medium and large sizes. The basic principles have been shown with a spoon, but are also intended for and are adaptable to a plug type artifical lure. This new lure 10 is of relatively low cost and is economically viable against very cost effective competition in the marketplace. The optional hook holder 18A can be used on the basis of an attachment accessory for existing devices. This invention offers excellent performance and value for its cost.

This new lure 10 has been tested in bullrush type weeds, in submerged trees, in underwater weeds, in rocks and over tree trunks and limbs. This lure 10 has been found, in actual testing, to be superior to the aforementioned prior art in avoiding snagging and/or the undesired snagging of weeks and the like.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. An artificial fishing lure, comprising
   (a) a body having a leading end with pulling means for connection to a fishing line;
   (b) a hook having a floppy mounting to an aft portion of the body; and
   (c) movable hook holder means mounted to and movable with respect to said body and engagable with said hook for
      (1) normally holding said hook backwards with respect to said body, and for
      (2) instantly releasing said hook to a typical trailing position upon disturbance of either said holder or said hook by a fish.

2. The lure of claim 1, in which said hook holder is mounted to said body in front of the backwards hook.

3. The lure of claim 2, in which said hook holder has a movable tail with snap means for resiliently holding the wire of the backwards hook.

4. The lure of claim 1, in which said hook is a treble with three tines, two of the tines being backwards against the body and a third tine being backwards and projecting outward from the body, in which said hook holder has a movable tail normally fastened to and holding said third tine outward of a shank of said hook.

5. The lure of claim 4, including a leading outward extending fin on said hook holder.

6. The lure of claim 1, in which said hook holder is pivotally mounted to the body.

7. The lure of claim 1, in which said hook holder has a nose with a generally C-shaped rivet, said rivet being fastened into and through said pulling means.

8. In an artificial fishing lure having a body and a hook floppy mounted to the body, the improvement of movable hook holder means mounted to the body for normally holding the hook backwards with respect to the body and for releasing the hook to a typical trailing position upon physical engagement of either the hook or the hook holder by a fish.

9. The improvement of claim 8, in which said hook holder is rotatably mounted in front of the backwards hook to a leading portion of the body.

10. The improvement of claim 8, in which said hook holder is resiliently cantilevered divergently from the body.

11. The improvement of claim 8, in which said hook holder has an elongate hook snap having an axis extending normal to said body.

12. The improvement of claim 8, in which said hook holder is normally connected to a backwards and outwards facing third tine which is outward from the shank of a treble said hook having the other two tines backwards against the body.

13. The improvement of claim 8, in which said hook holder has a nose with an integral rivet extending therefrom, said rivet being snap fitted into a leading line connection aperture in the body, said nose having means for providing for connection of a fishing line to said lure.

14. A integral one piece hook holder and weed deflector for an artifical fishing lure, comprising
    (a) a leading nose having means for fastening the holder to a body of the artificial lure;
    (b) an elongate cantilevered and resiliently movable body extending rearward from the nose;
    (c) a movable tail on the rearward end of the body; and
    (d) snap means in said movable tail for resiliently grasping and holding the wire of a fishing hook.

15. The hook holder and deflector of claim 4, including a fin between the nose and the tail.

16. The hook holder and deflector of claim 14, in which said snap means is parallel to said fastening means.

17. The hook holder and deflector of claim 14, in which said snap means is an elongate partially enclosed slot having an axis generally normal to the body.

18. The hook holder and deflector of claim 17, in which said body is resiliently flexible in a plane defined by the slot and the fastening means.

19. The hook holder and deflector of claim 14, in which said fastening means comprise a generally C-shaped rivet projecting normally from said nose.

20. An accessory for an artificial fishing lure having a body with a leading aperture for being connected to a fishing line, said accessory comprising
    (a) a leading nose;
    (b) means aft of said nose for improving the functionability of the lure; and
    (c) a rivet having a generally C-shaped cross-section extending normally from said nose, said rivet being fastenable in and through said aperture while providing for connection of the line thereto.

21. An accessory according to claim 20, included a generally C-shaped snap-fit retainer head on an outer end of said rivet.

22. A method of weedless fishing with an artificial lure, comprising the steps of
    (a) pulling the lure through water;
    (b) holding a floppy mounted hook backwards on the lure with a movable hook holder during said pulling; and
    (c) instantly releasing said hook to a typical trailing position upon physical engagement and movement with respect to the body of either the hook or the movable hook holder by a fish.

23. The method of claim 22 including the further steps of holding two tines of a treble said hook backwards against a body of the lure, and resiliently holding on to a backwards and outward facing third tine of said hook to the outside of a shank of the hook.

24. The method of claim 22, in which said step of releasing is done in response to movement of the hook holder either toward or in rotation with respect to the body of the lure.

25. The method of claim 22, including the steps of skewing a rotatable said hook holder pivotally mounted on the body of the lure with respect to a fore-aft centerline of the lure body, and inducing an erratic action of the lure.

26. The method of claim 22, including holding a treble said hook backwards by snapping a hook holder onto a single outward facing elongate tine portion of said hook, outward of a shank of said hook.

* * * * *